US011913618B2

(12) United States Patent
Kemetmüller

(10) Patent No.: US 11,913,618 B2
(45) Date of Patent: Feb. 27, 2024

(54) ILLUMINATION DEVICE FOR A MOTOR VEHICLE HEADLAMP

(71) Applicant: ZKW Group GmbH, Wieselburg (AT)

(72) Inventor: Matthias Kemetmüller, Vienna (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/034,978

(22) PCT Filed: Oct. 18, 2021

(86) PCT No.: PCT/EP2021/078769
§ 371 (c)(1),
(2) Date: May 2, 2023

(87) PCT Pub. No.: WO2022/100964
PCT Pub. Date: May 19, 2022

(65) Prior Publication Data

US 2024/0019093 A1 Jan. 18, 2024

(30) Foreign Application Priority Data

Nov. 12, 2020 (EP) .................................... 20207143

(51) Int. Cl.
*F21S 41/24* (2018.01)
*F21S 41/20* (2018.01)

(52) U.S. Cl.
CPC ............. *F21S 41/24* (2018.01); *F21S 41/285* (2018.01)

(58) Field of Classification Search
CPC ...... F21S 43/235; F21S 43/236; F21S 43/237; F21S 43/243; F21S 43/251; F21S 41/24; F21S 41/285
See application file for complete search history.

(56) References Cited

U.S. PATENT DOCUMENTS 10,274,151 B2 * 4/2019 Faffelberger ............ F21S 43/27
10,895,361 B1 * 1/2021 Crespin ................ B60Q 1/2607
(Continued)

FOREIGN PATENT DOCUMENTS

DE 102005019018 A1 10/2006
DE 102013226133 A1 6/2015
KR 101987295 B1 6/2019

OTHER PUBLICATIONS

European Search Report for European Patent No. 20207143.7, dated Mar. 23, 2021 (5 Pages).
(Continued)

*Primary Examiner* — Matthew J. Peerce
(74) *Attorney, Agent, or Firm* — Eversheds Sutherland (US) LLP

(57) ABSTRACT

Illumination device (1) for a motor vehicle headlight, comprising a first light guide (2), a second light guide (3), an optical device (4) with a first (5*a*) and second light input surface (6*a*) and a first (5*b*) and second light output surface (6*b*), wherein the light from the first light guide (2) can be injected into the optical device (4), passes through the optical device (4) and can exit via the first light output surface (5*b*), wherein the light from the second light guide (8) can be injected into the optical device (4), passes through the optical device (4) and can exit via the second light output surface (6*b*), wherein the first light output surface (5*b*) is formed from a plurality of first surface elements (7) and the second light output surface (6*b*) is formed from a plurality of second surface elements (8), wherein the first (7) and second surface elements (8) are arranged alternately with respect to one another in such a way that they form a step-like structure, wherein a first (7) surface element with a subsequent second surface element (8) respectively form a
(Continued)

step, wherein the first surface element (7) forms an angle of 45° to 135° with the subsequent second surface element (8).

17 Claims, 3 Drawing Sheets

(56) References Cited

U.S. PATENT DOCUMENTS

| | | | | |
|---|---|---|---|---|
| 2017/0067615 | A1 | 3/2017 | Okura | |
| 2021/0231287 | A1* | 7/2021 | Muegge ................ | F21S 43/249 |
| 2021/0231288 | A1 | 7/2021 | Muegge | |

OTHER PUBLICATIONS

International Search Report and Written Opinion for PCT/EP2021/078769, dated Dec. 8, 2021 (15 Pages).

* cited by examiner

ILLUMINATION DEVICE FOR A MOTOR VEHICLE HEADLAMP

The invention relates to an illumination device for a motor vehicle headlight, comprising:

- a first light guide, which is configured to guide light from a light source and to emit it along a first direction;
- a second light guide, which is configured to guide light from a light source and to emit it along a second direction;
- an optical device, which is configured to emit light from the first and second light guide as an optical light function into a traffic area, wherein the optical device has a first light input surface, a first light output surface associated with the first light input surface, a second light input surface and a second light output surface associated with the second light input surface.

The invention further relates to a motor vehicle headlight, comprising an illumination device.

Illumination devices for motor vehicle headlights are known in the prior art, wherein two light guides supply light to an optical device for generating a light function. If the light is to be emitted by the optical device in at least two directions, diffuse emission usually occurs through the light output surfaces of the optical device. However, this results in a low light intensity and inadequate light emission in at least one of the two directions.

The object of the present invention consists in mitigating or eliminating the disadvantages of the prior art. The objective of the invention is therefore in particular to create an illumination device that improves the emission of light.

This object is achieved by an illumination device having the features of claim 1. Preferred embodiments are specified in the dependent claims.

According to the invention, the first light guide is arranged with respect to the first light input surface in such a way that the light from the first light guide can be injected into the optical device via the first light input surface, wherein the light injected by the first light guide passes through the optical device and can exit via the first light output surface, wherein the second light guide is arranged with respect to the second light input surface in such a way that the light from the second light guide can be injected into the optical device via the second light input surface, wherein the light injected by the second light guide passes through the optical device and can exit via the second light output surface,

- wherein the first light output surface is formed by a plurality of first surface elements and the second light output surface is formed by a plurality of second surface elements,
- wherein the first and second surface elements are arranged alternately with respect to one another in such a way that they form a substantially step-like structure, wherein a first surface element with a subsequent second surface element respectively form a step, wherein the first surface element forms an angle of 45° to 135°, preferably substantially 90°, with the subsequent second surface element.

This has the advantage that two differently oriented light output surfaces emit light in two different directions, wherein a light output surface is respectively supplied with light by means of a corresponding light guide. Illumination in two different directions can thus be particularly efficient. The first direction, which corresponds in particular to the light emission direction of the first light guide, is preferably parallel to a longitudinal direction of a vehicle, in which the illumination device can be installed. The second direction, which corresponds in particular to the light emission direction of the second light guide, is preferably orthogonal to a longitudinal direction of a vehicle, in which the illumination device can be installed. The first and second light output surfaces preferably together form a coherent, in particular closed, overall output surface, which follows an imaginary curved plane, for example. Light is guided within the light guide, preferably by means of total internal reflection at the interfaces of the light guide. Deflection elements are preferably arranged within the light guide at output points, which deflection elements are configured to deflect light in such a manner that the light exits the light guide. The light guide is configured, for example, as a rod-shaped light guide with an exit side and output elements opposite the exit side.

It can be provided that the step-like structure follows a curved path. The curved path or trajectory is a theoretical construct and can have a start region and an end region, wherein the start region of the trajectory can comprise a notional area, which can be oriented substantially orthogonal to the first direction and parallel to the second direction. The end region of the trajectory can comprise a notional area, which can be oriented substantially parallel to the first direction and orthogonal to the second direction. The optical device can run along the curved path or trajectory.

It can be provided that the first light input surface is oriented substantially parallel to the first light output surface and the second light input surface is oriented substantially parallel to the second light output surface.

It can be provided that the first and second surface elements are substantially rectangular, preferably square. The edge length of a first and/or second surface element can be 0.5 mm to mm, preferably 1 mm to 5 mm. The dimensions, in particular the length and width, of the first and second surface elements are preferably the same. The first and second surface elements are preferably configured to scatter or diffuse the light during output. This means it is possible to achieve homogeneous light emission. The first and second surface elements are preferably configured to leave the light beams substantially unchanged in their alignment during output. The angle at which the light can be injected via the first and second light input surface can be determined in particular by the position of the first or second light guide relative to the first or second light input surface.

It can be provided that spatial vectors of the first surface elements and spatial vectors of the second surface elements lie in one and the same plane. The spatial vector of the first surface element is in particular arranged at the centre of the first surface element. The spatial vector of the second surface element is in particular arranged at the centre of the second surface element.

It can be provided that first and second surface elements alternately adjoin each other. The first and second surface elements preferably contact each other at an edge of the respective surface element, wherein a closed, step-like arrangement of first and second surface elements can thus be achieved.

It can be provided that the first and second light output surface have at least two, preferably more, rows of steps, which are respectively formed from first and second surface elements arranged in a step-like manner with respect to one another. A row of steps is in particular formed from several first and second surface elements, wherein first and second surface elements are preferably alternately arranged in a row of steps. A first row of steps is preferably arranged vertically above or below a second row of steps. A row of steps can have a longitudinal direction, along which the first and second surface elements are aligned, wherein a second row of steps is arranged offset from the first row of steps in a direction transverse to the longitudinal direction.

It can be provided that the at least two, preferably more, rows of steps are arranged one above the other along a third direction, which is oriented orthogonal to the first and second direction. The third direction is in particular orthogonal to a plane, which is spanned by a direction vector of the first direction and a direction vector of the second direction.

It can be provided that two rows of steps arranged one above the other are directly adjacent to each other in the third direction.

It can be provided that the at least two, preferably more, rows of steps are arranged offset from one another by a first and/or second surface element along the first and/or second direction in such a manner that the first and second surface elements form a cube structure in the at least two rows of steps. In other words, a first row of steps can be arranged offset with respect to a second row of steps in particular vertically and horizontally, wherein the horizontal and vertical offset preferably has a distance that corresponds to a length or width of a first or second surface element. The light emitting surface can be substantially formed from a plurality of cube elements, wherein the individual cubes are arranged with respect to one another in a uniform grid, in particular in matrix form.

It can be provided that the first direction is oriented orthogonal to the first surface elements. In other words, the light emission direction of the first light guide is preferably orthogonal to the first surface elements. This has the advantage of minimizing unwanted light scattering at the interface transition.

It can be provided that the second direction is oriented orthogonal to the second surface elements. In other words, the light emission direction of the second light guide is preferably orthogonal to the second surface elements. This has the advantage of minimizing unwanted light scattering at the interface transition.

It can be provided that the first direction is oriented orthogonal to the first light input surface. This can minimize light scattering during injection.

It can be provided that the second direction is oriented orthogonal to the second light input surface. This can minimize light scattering during injection.

A motor vehicle headlight is provided according to the invention, wherein the motor vehicle headlight comprises the illumination device.

In the context of this description, the terms “above”, “below”, “horizontal”, “vertical” should be understood as indications of orientation when the illumination device is arranged in its normal position of use after having been fitted to a motor vehicle headlight.

The invention is outlined in more detail below based on a preferred exemplary embodiment, to which it is, however, not limited: In the drawings.

For simplicity, non-essential elements are not shown in the figures.

Figure 1:
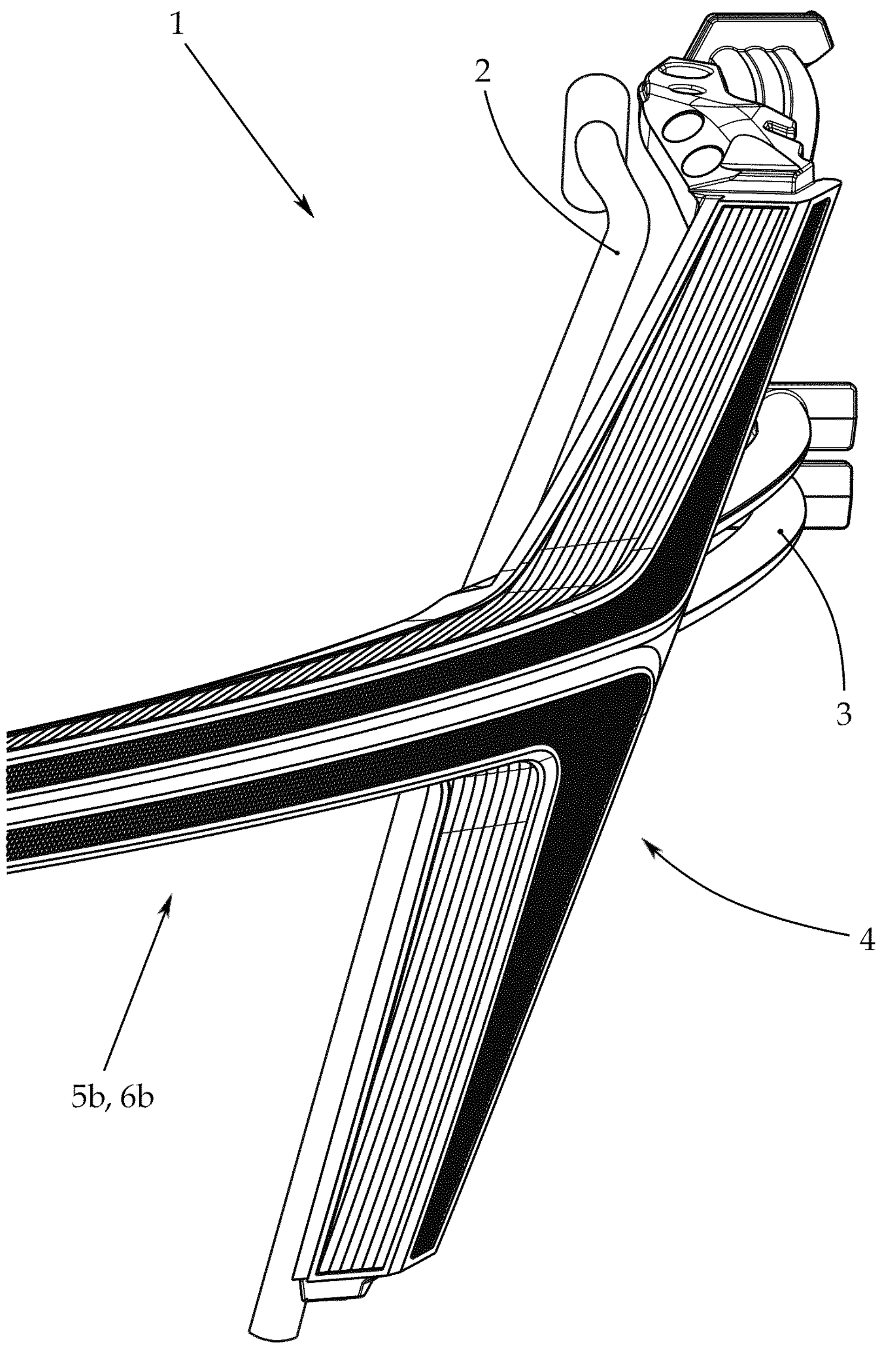
FIG. 1 shows a detail view of an illumination device according to the invention.
Figure 2:
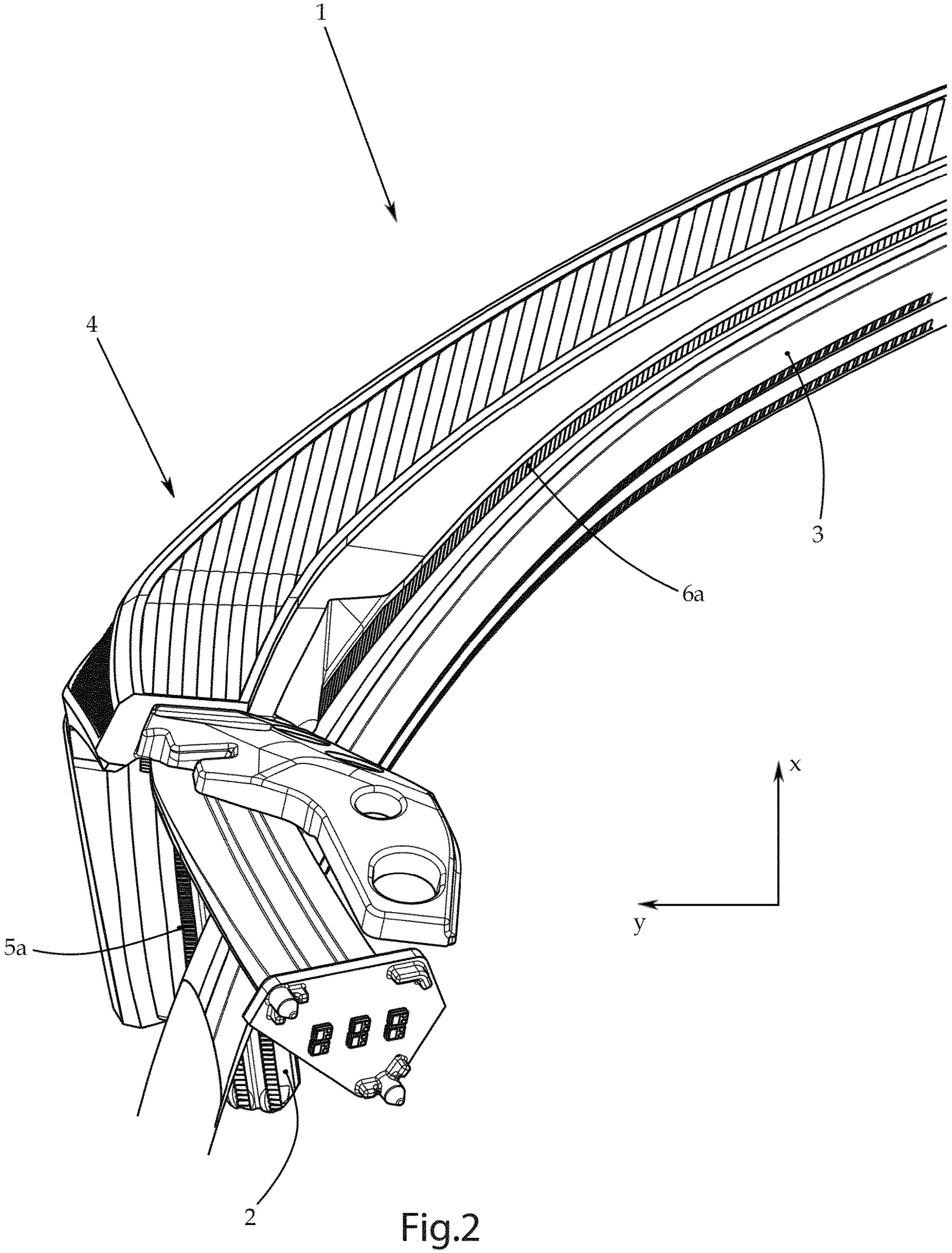
FIG. 2 shows a further detail view of the illumination device according to FIG. 1.

FIGS. 1 and 2 show detail views of an illumination device 1 according to the invention, comprising a first light guide 2, which is configured to guide light from a light source (not shown) and to emit it along a first direction (x) and a second light guide 3, which is configured to guide light from a light source (not shown) and to emit it along a second direction (y).

An optical device 4 is configured to emit light from the first 2 and second light guide 3 as an optical light function into a traffic area. The optical device 4 has a first light input surface 5*a*, a first light output surface 5*b* associated with the first light input surface 5*a*, a second light input surface 6*a* and a second light output surface 6*b* associated with the second light input surface 6*a*.

The first light guide 2 is arranged with respect to the first light input surface 5*a* in such a way that the light from the first light guide 2 can be injected into the optical device 4 via the first light input surface 5*a*, wherein the light injected by the first light guide 2 passes through the optical device 4 and can exit via the first light output surface 5*b*.

The second light guide 3 is arranged with respect to the second light input surface 5*a* in such a way that the light from the second light guide 3 can be injected into the optical device 4 via the second light input surface 6*a*, wherein the light injected by the second light guide 3 passes through the optical device 4 and can exit via the second light output surface 6*b*. The first light input surface 5*a* is oriented substantially parallel to the first light output surface 5*b* and the second light input surface 6*a* is oriented substantially parallel to the second light output surface 6*b*.

Figure 3:
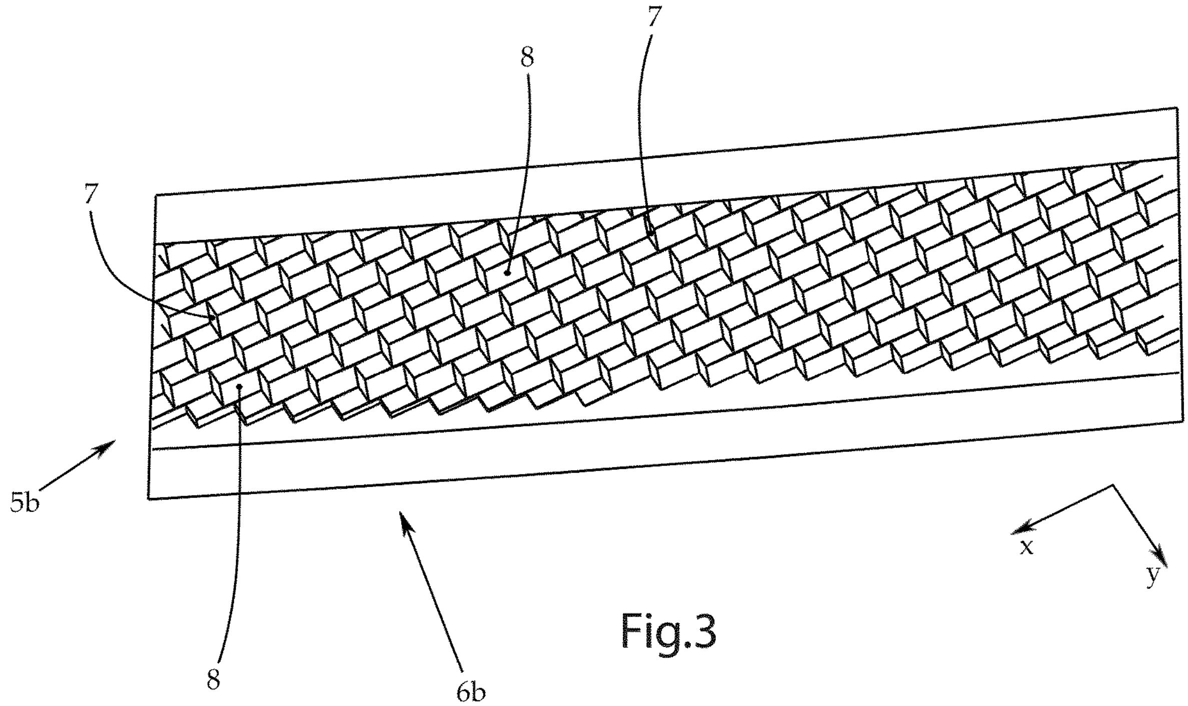
FIG. 3 shows a detail view of a first and second light output surface of the illumination device.

FIG. 3 shows a detail view of the first 5*b* and second light output surface 6*b* of the illumination device 1. The first light output surface 5*b* is formed by a plurality of first surface elements 7 and the second light output surface 6*b* is formed by a plurality of second surface elements 8.

The first 7 and second surface elements 8 are arranged alternately with respect to one another in such a way that they form a substantially step-like structure. A first surface element 7 respectively forms with a subsequent second surface element 8 a step, wherein a first surface element 7 forms an angle of 45° to 135°, preferably substantially 90°, with a subsequent second surface element 8. The first 7 and second surface elements 8 are substantially rectangular, preferably square. In particular, first 7 and second surface elements 8 alternately adjoin each other.

The step-like structure or overall light output surface, which is formed from the first 5*b* and second light output surface 6*b*, can follow a curved path (see FIG. 2).

Spatial vectors of the first surface elements 7 and spatial vectors of the second surface elements 8 preferably lie in one and the same plane.

The first 5*b* and second light output surface 6*b* have at least two, preferably more, rows of steps, which are respectively formed from first 7 and second surface elements 8 arranged in a step-like manner with respect to one another. The exemplary embodiment shown in FIG. 3 has six rows of steps.

The at least two, preferably more, rows of steps are arranged one above the other along a third direction, which is oriented orthogonal to the first and second direction. The third direction is substantially vertical. Two rows of steps arranged one above the other are directly adjacent to each other in the third direction.

The at least two, preferably more, rows of steps are arranged offset from one another by a first 7 or second surface element 8 along the first and/or second direction in such a manner that the first and second surface elements form a cube structure in the at least two rows of steps.

The first direction (x) is oriented in particular orthogonal to the first surface elements 7.

The second direction (y) is oriented in particular orthogonal to the second surface elements 8.

The first direction (x) is oriented in particular orthogonal to the first light input surface 5*a*.

The second direction (y) is oriented in particular orthogonal to the second light input surface 6*a*.

The first direction can be oriented parallel to the longitudinal direction of the motor vehicle in a state in which the illumination device 1 is fitted to a motor vehicle. The first direction can thus correspond to the light emission direction of light emitted with a motor vehicle headlight fitted to the motor vehicle. The second direction can be oriented orthogonal to the longitudinal direction of the motor vehicle.

The invention claimed is:

1. An illumination device (1) for a motor vehicle headlight, comprising:

a first light guide (2), which is configured to guide light from a light source and to emit it along a first direction (x);

a second light guide (3), which is configured to guide light from a light source and to emit it along a second direction (y); and an optical device (4), which is configured to emit light from the first (2) and second light guide (3) as an optical light function into a traffic area, wherein the optical device (4) has a first light input surface (5*a*), a first light output surface (5*b*) associated with the first light input surface (5*a*), a second light input surface (6*a*) and a second light output surface (6*b*) associated with the second light input surface (6*a*), wherein the first light guide (2) is arranged with respect to the first light input surface (5*a*) in such a way that the light from the first light guide (2) can be injected into the optical device (4) via the first light input surface (5*a*), wherein the light injected by the first light guide (2) passes through the optical device (4) and can exit via the first light output surface (5*b*), wherein the second light guide (3) is arranged with respect to the second light input surface (6*a*) in such a way that the light from the second light guide (3) can be injected into the optical device (4) via the second light input surface (6*a*), wherein the light injected by the second light guide (3) passes through the optical device (4) and can exit via the second light output surface (6*b*), wherein the first light output surface (5*b*) is formed by a plurality of first surface elements 7 and the second light output surface (6*b*) is formed by a plurality of second surface elements (8), and wherein the first (7) and second surface elements (8) are arranged alternately with respect to one another in such a way that they form a substantially step-like structure, wherein a first surface element (7) with a subsequent second surface element (8) respectively form a step, wherein the first surface element (7) forms an angle of 45° to 135° with the subsequent second surface element (8).

2. The illumination device (1) according to claim 1, wherein the step-like structure follows a curved path.

3. The illumination device (1) according to claim 1, wherein the first light input surface (5*a*) is oriented substantially parallel to the first light output surface (5*b*) and the second light input surface (6*a*) is oriented substantially parallel to the second light output surface (5*b*).

4. The illumination device (1) according to claim 1, wherein the first (7) and second surface elements (8) are substantially rectangular.

5. The illumination device (1) according to claim 1, wherein spatial vectors of the first surface elements (7) and spatial vectors of the second surface elements (8) lie in one and the same plane.

6. The illumination device (1) according to claim 1, wherein first (7) and second surface elements (8) alternately adjoin each other.

7. The illumination device (1) according to claim 1, wherein the first (5*b*) and second light output surface (6*b*) have at least two rows of steps, which are respectively formed from first (7) and second surface elements (8) arranged in a step-like manner with respect to one another.

8. The illumination device (1) according to claim 7, wherein the at least two rows of steps are arranged one above the other along a third direction, which is oriented orthogonal to the first (x) and second direction (y).

9. The illumination device (1) according to claim 8, wherein two rows of steps arranged one above the other are directly adjacent to each other in the third direction.

10. The illumination device (1) according to claim 7, wherein the at least two rows of steps are arranged offset from one another by a first (7) and/or second surface element (8) along the first (x) and/or second direction (y) in such a manner that the first (7) and second surface elements (8) form a cube structure in the at least two rows of steps.

11. The illumination device (1) according to claim 1, wherein the first direction (x) is oriented orthogonal to the first surface elements (7).

12. The illumination device (1) according to claim 1, wherein the second direction (y) is oriented orthogonal to the second surface elements (8).

13. The illumination device (1) according to claim 1, wherein the first direction (x) is oriented orthogonal to the first light input surface (5*a*).

14. The illumination device (1) according to claim 1, wherein the second direction (y) is oriented orthogonal to the second light input surface (6).

15. A motor vehicle headlight, comprising an illumination device (1) according to claim 1.

16. The illumination device according to claim 1, wherein the first surface element forms an angle of substantially 90° with the subsequent second surface element.

17. The illumination device according to claim 1, wherein the first and second surface elements are substantially square.

* * * * *